US011932036B2

(12) United States Patent
Dülme et al.

(10) Patent No.: US 11,932,036 B2
(45) Date of Patent: Mar. 19, 2024

(54) METHOD AND DEVICE FOR MARKING ELECTRICAL DEVICES WHICH CAN BE ARRANGED IN A ROW

(71) Applicant: Weidmüller Interface GmbH & Co. KG, Detmold (DE)

(72) Inventors: Christian Dülme, Paderborn (DE); Stefan Lorenz, Schlangen (DE); Farhad Sarrafzadegan, Stolberg (DE); Jan Marrenbach, Warstein (DE); Guido Männchen, Aachen (DE); Detlef Reising, Attendorn (DE); Peter Langosch, Hagen (DE)

(73) Assignee: Weidmüller Interface GmbH & Co. KG (DE)

( * ) Notice: Subject to any disclaimer, the term of this patent is extended or adjusted under 35 U.S.C. 154(b) by 127 days.

(21) Appl. No.: 17/778,737

(22) PCT Filed: Nov. 24, 2020

(86) PCT No.: PCT/EP2020/083245
§ 371 (c)(1),
(2) Date: May 20, 2022

(87) PCT Pub. No.: WO2021/105140
PCT Pub. Date: Jun. 3, 2021

(65) Prior Publication Data

US 2023/0016755 A1 Jan. 19, 2023

(30) Foreign Application Priority Data

Nov. 25, 2019 (DE) ..................... 10 2019 131 750.9

(51) Int. Cl.
*B41J 3/407* (2006.01)
*B41M 5/24* (2006.01)

(52) U.S. Cl.
CPC ............ *B41J 3/40731* (2020.08); *B41M 5/24* (2013.01)

(58) Field of Classification Search
CPC ...... B41J 3/40731; B41J 2/442; B41J 3/4073; B41M 5/24; B41M 5/26; H01R 9/2683
See application file for complete search history.

(56) References Cited

U.S. PATENT DOCUMENTS 10,586,474 B2 3/2020 Klages et al.

FOREIGN PATENT DOCUMENTS

CN 202192857 U 4/2012
DE 102016100722 A1 7/2017
(Continued)

OTHER PUBLICATIONS

Machine Translation of WO 2017/125385 to Klages, Kilian et al., Method For Attaching Marking Labels To A Plurality of Electrical Devices Which Can be Arranged on a support rail, [Abstract, Description], Jul. 27, 2017 (Year: 2017).*

*Primary Examiner* — Lisa Solomon
(74) *Attorney, Agent, or Firm* — LAUBSCHER & FRETWELL, P.C.

(57) ABSTRACT

A method and device are provided for marking electrical devices which can be arranged in a row on a support rail, with the aid of a laser head, wherein the support rail is pivotable about its longitudinal axis and the laser head is guided such that it can be moved at least along the longitudinal axis of the support rail. A number of marking instructions, each including a marking content and a position and an orientation of the surface to which the marking content is to be applied are specified. An image of at least a section of the support rail and of at least one electrical device are created from an image capture device and at least one of the positions at which one of the marking contents is to be applied is corrected based on an evaluation of the image. The
(Continued)

marking instructions are grouped into marking levels in such a way that all marking instructions of one marking level can be applied by the laser head without a movement of the laser head or the support rail. The marking levels differ in terms of spatial coordinates and/or parameters for the laser head. A first one of the marking levels is selected, and the laser head is positioned and/or the support rail is pivoted according to the spatial coordinates of the selected marking level. Markings are applied according to the marking instructions of the selected marking level with the parameters for the laser head. A next one of the marking levels for marking is selected based on the movements of the laser head and the support rail which would be necessary to enables markings according to the next one of the marking levels to be applied.

20 Claims, 14 Drawing Sheets

(56) References Cited

FOREIGN PATENT DOCUMENTS

WO 2017125364 A1 7/2017
WO WO-2017125385 A1 * 7/2017 .............. B41J 2/442

* cited by examiner

METHOD AND DEVICE FOR MARKING ELECTRICAL DEVICES WHICH CAN BE ARRANGED IN A ROW

This application claims priority of PCT/EP 2020/083245 filed Nov. 24, 2020 which claims priority of DE 10 2019 131750.9 filed Nov. 25, 2019, the entire contents of which are incorporated herein by reference.

BACKGROUND OF THE INVENTION

The invention relates to a method for marking electrical devices which can be arranged in a row on a support rail with the aid of a laser head. The support rail can be pivoted in its longitudinal axis and the laser head is guided so that it can be moved at least along the longitudinal axis of the support rail. The invention further relates to a marking device suitable for carrying out the method.

Support rails are used to snap on electrical devices in installation technology. In apparatus engineering in particular, prefabricated support rail sections, which are then installed on site in control cabinets, are often used that have a large number of electrical devices arranged next to each other. Among the electrical devices are often terminal blocks, each of which in turn has a plurality of terminals. To facilitate wiring of the arrangement within the control cabinet, the individual devices and also their connections can be marked, for example by having corresponding marking surfaces.

BRIEF DESCRIPTION OF THE PRIOR ART

The publication WO 2010/057768 A1 shows a device with which support rails can be automatically equipped with electrical devices, in particular terminal blocks. A printing unit is provided which prints on the marking surfaces of an electrical device taken from a magazine before it is mounted on the support rail.

An alternative approach is known from WO 2017/125364 A1, in which the support rails are first fitted with the electrical devices and the devices are then marked. For this purpose, the document describes a marking device which has a support rail receptacle and a laser head which applies the desired markings to marking fields of the devices. The receptacle device is coupled to a linear and pivoting device so that the support rail with the electrical devices can be moved and pivoted in front of the laser head in order to be able to move the marking fields to be labeled into the marking area of the laser head.

In large control cabinets or switching devices, support rails are used that can reach a length in the range of one to over one meter and can be equipped with a plurality of electrical devices. In this case, it is possible to mark each electrical device at several positions, optionally with different orientations. In this way, a large number of markings can be applied to a support rail, wherein the marking process itself and the pivoting operations of the support rail and traversing operations of the laser head take time.

SUMMARY OF THE INVENTION

It is an object of the present invention to create a marking process of the type mentioned at the beginning, with which predetermined markings can be applied to the electrical devices latched onto a support rail in the shortest possible time and with high precision. It is a further object to create a marking device suitable for carrying out the process.

A method according to the invention includes the following steps: A number of marking instructions are specified, each including a marking content, a position and an orientation of the surface to which the marking content is to be applied. Further, an image of at least a section of the support rail and at least one electrical device is obtained from an image capture device. Based on an evaluation of the image, at least one of the positions where one of the marking contents is to be applied is then corrected. Then, the marking instructions are grouped into marking levels such that all of the marking instructions of a marking level can be applied by the laser head without a movement of the laser head or the support rail, wherein the marking levels differ in spatial coordinates and/or parameters for the laser head. A first of the marking levels is selected and—according to the spatial coordinates of the selected marking level—the laser head is positioned and/or the support rail is pivoted. Markings are applied to this selected marking level using the parameters for the laser head according to the marking instructions. Subsequently, a next one of the marking levels is selected for marking, this selection being made on the basis of the movements of the laser head and the support rail that would be necessary to apply markings according to the next one of the marking levels.

Especially with longer equipped support rails, the actual position of a marking field that is to be labeled may differ from the intended position. This is due to unavoidable size tolerances of the individual devices or also their incomplete gap-free or slightly slanted arrangement on the support rail, as well as a change in size caused by temperature and/or ambient humidity. Particularly in the case of longer support rails, these size tolerances or deviations or gap dimensions can add up so that actual marking positions deviate from calculated positions by several millimeters (mm). Aligning the positions at which the markings are then subsequently applied on the basis of the image prevents incorrect positioning, which means that a precisely applied marking, e.g. labeling, can be made.

Preferably, this is done by creating and evaluating the image before the step of grouping the marking instructions into marking levels, wherein the grouping is then carried out based on the corrected positions. In this way, the corrected position is already taken into account when the markings are divided among the various marking groups. It is thus ensured that a mark lying at the edge of a marking area can actually be created at its corrected position and does not end up in an area that is no longer accessible at the given position of the laser head as a result of the correction.

In the method, therefore, the markings are first grouped in so-called marking levels in such a way that markings that can each be applied with the same positions of laser head and support rail and the same settings of the laser head are bundled. This prevents unnecessary movements and changes in settings. In particular, unnecessary movements cost time, which prolongs the marking process.

Further, the individual groups are then processed in the most efficient sequence possible by taking into account the movements to be made when changing to the next marking level, which also avoids unnecessary movement sequences when positioning the laser head or the support rail.

In order to efficiently apply all of the markings in the shortest possible time, the steps of positioning the laser head and/or tilting the support rail, applying the marks, and selecting a next one of the marking levels are repeated until all the marking levels have been processed.

In the context of the present application, the term "electrical device" is understood to mean any device with a support rail receptacle for arrangement on a support rail. These are, for example, purely passive terminal blocks, but also devices with switching or fuse elements, such as circuit breakers, fall under the term "electrical device", as do devices with electronic components or elements that can be placed on a support rail.

In an advantageous embodiment of the method, the next of the marking levels is selected in such a way that pivoting of the support rail is preferred over movement of the laser head in the longitudinal direction. Accordingly, the different movement processes (movement of the laser head or pivoting of the support rail) are weighted differently when selecting the next marking level.

In a possible design of the method, to select the next of the marking levels, priority values are assigned to the remaining marking levels not yet processed based on the spatial coordinates of the marking levels, and the next marking level to be processed is selected based on the priority values. Such a method can be easily carried out systematically and adapted to the device-based characteristics of the marking device. For example, the spatial coordinates of the marking levels can be used to determine which movements of the laser head and/or the support rail are necessary, with different priority indexes assigned to different movements. The priority indices enable optimal adaptation of the method to the characteristics of the marking device. The priority indices of necessary movements are then added up to obtain the priority value of a marking level.

In one design, movement of the laser head in the longitudinal direction is assigned a larger priority index than pivoting of the support rail, if smaller priority values are preferred during the selection. With a suitable design of the marking device, the pivoting can be carried out faster than a movement of the laser head in the longitudinal direction, which is taken into account accordingly by priority indices. Movements of the laser head in a direction other than the longitudinal direction, on the other hand, can be assigned lower priority indices than a movement of the laser head in the longitudinal direction. Moving the laser head in such other directions of movement serves, for example, to change the distance of the laser head from the devices to be marked and to reach areas that are further up or down on the devices.

In an advantageous embodiment of the method, at least two images are created in different pivoting positions of the support rail in order to be able to recognize marking fields that are also at an angle in the best possible way.

Advantageously, one or more positions of a marking field for a marking to be applied are detected during the evaluation of the at least one image. In the case of a small marking field, this can be a center point of the marking field, for example, whose coordinates are then used for position correction. In the case of a larger marking field, preferably at least two positions of the marking field for a mark to be applied are detected, whereby in addition to the position of the mark to be applied, its orientation can also be corrected.

A device according to the invention for marking electrical devices which can be arranged in a row on a support rail has a receptacle for the support rail and a laser head for applying the marking to the electrical devices. The receptacle is pivotably mounted about its longitudinal axis, and the laser head is guided so as to be movable in at least one longitudinal direction which extends parallel to the longitudinal axis of the receptacle. The device includes a control device arranged to perform such a method. Furthermore, the device has an image capture device for imaging the support rail inserted in the receptacle and the electrical devices arranged thereon.

Preferably, the image capture device is arranged directly or indirectly on the movable carriage of the linear guide and is especially preferably a line scan camera. The image capture device makes it possible to adapt predefined positions of the markings to be applied to actual conditions if deviations occur in this respect due to tolerances or gaps.

In an advantageous design of the device, a linear guide with a displaceable carriage, on which the laser head is directly or indirectly mounted, is arranged parallel to the receptacle. Provision can be made to mount the laser head on the carriage via one or more further linear guides extending perpendicularly to the linear guide. An additional further linear guide in the horizontal direction makes it possible to bring the laser head to a suitable focus distance from the surface to be marked, unless the laser head has internal devices for varying the focus distance. An additional further linear guide in a vertical direction extends the marking area upwards and downwards.

In a preferred embodiment, the receptacle has a longitudinal member with a receiving bed for receiving the support rail, which is held by pivot arms eccentric to an axis of rotation. Preferably, the receiving bed is arranged about 20 to 30 mm off-center from the center of the axis of rotation.

The eccentric pivoting movement of the receptacle and thus of the support rail is based on the knowledge that, on average, the center of mass of the electrical devices to be labeled, especially in the case of terminal blocks, is approximately 20 to 30 mm above the support rail receptacle of the electrical devices. As a result of the fact that the receiving bed is spaced from the axis of rotation by the aforementioned distance, the electrical devices are rotated on average in their own center of mass, which enables a fast and, as far as possible, inertia-free rotary movement. In this way, the forces occurring during an acceleration of the rotary motion are minimized. In this way, the highest possible rotational acceleration and thus a pivoting movement that can be executed quickly is achieved, which shortens the marking process overall.

Further advantageously, the receptacle is mounted in such a way that it can be pivoted through a rotation angle greater than 360° without a stop. Preferably, the angle of rotation is also significantly greater than 360° and is, for example, 720°. It can also be provided that any angle of rotation is possible without a stop. The rotary feedthrough is designed in such a way that a power supply for the electromagnets can be provided for the entire range of rotation. The free pivoting capability achieved in this way makes it possible to pivot the support rail in any direction, and thus to change to further labeling positions in any situation using the shortest possible pivoting path. It is thus possible to change to a next labeling position in any case with a rotary movement of less than 180°.

In another advantageous design of the device, the laser head has a laser that emits in an ultraviolet (UV) wavelength range. Light in the UV wavelength range offers the advantage that markings can be applied to virtually any plastic surface. The electrical devices to be marked can have designated fields for marking, but these do not have to be provided with a special coating or plastic, as is usually necessary for markings with infrared (IR) light. In addition, it is possible to apply markings to areas of electrical equipment that are not specifically designated. Moreover, the applied markings can not only be pure color changes, but, if suitable parameters and focusing of the laser radiation are used, are accompanied by material removal or material modification that makes the markings palpable (such as tactile marking).

BRIEF DESCRIPTION OF THE FIGURES

The invention is explained in more detail below by means of exemplary embodiments with the aid of accompanying drawing figures, wherein.

DETAILED DESCRIPTION

In FIGS. 1-4, an example of a device for marking electrical devices that can be arranged in a row, hereinafter referred to as a marking device for short, is shown in each case in an isometric or perspective representation. A marking method according to the application, which can be carried out with this device, is described in connection with FIGS. 7*a* to 9. Examples of individual electrical devices that can be arranged in a row and blocks thereof that can be marked with the device are shown in FIGS. 10*a*-*c*, 11 and 12.

The marking device is shown in each case with a received support rail 1 onto which a number of electrical devices 2 are snapped or latched. All of the latched devices 2 shown in the figures of this application are terminal blocks. However, it is understood that other latched electrical or even electronic devices, such as fuses or circuit breakers, may also be latched onto the support rail 1 and marked by the device shown. Merely for the sake of simpler presentation, the electrical devices 2 are also referred to below as terminal blocks 2.

Figure 1:
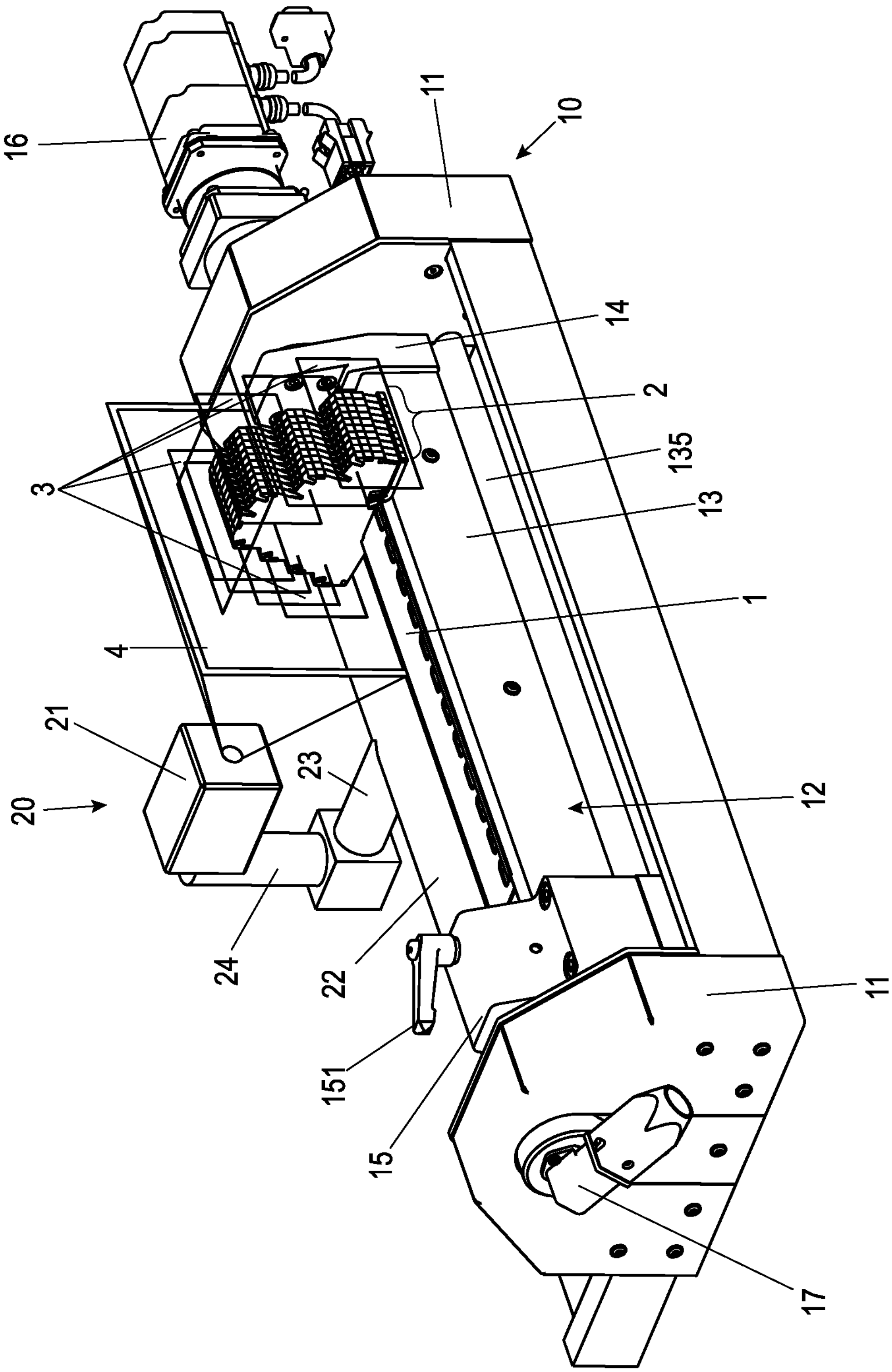
FIGS. 1-4 are various perspective views, respectively, of a device for marking electrical devices with different support rails inserted with the electrical equipment to be marked.
Figure 2:
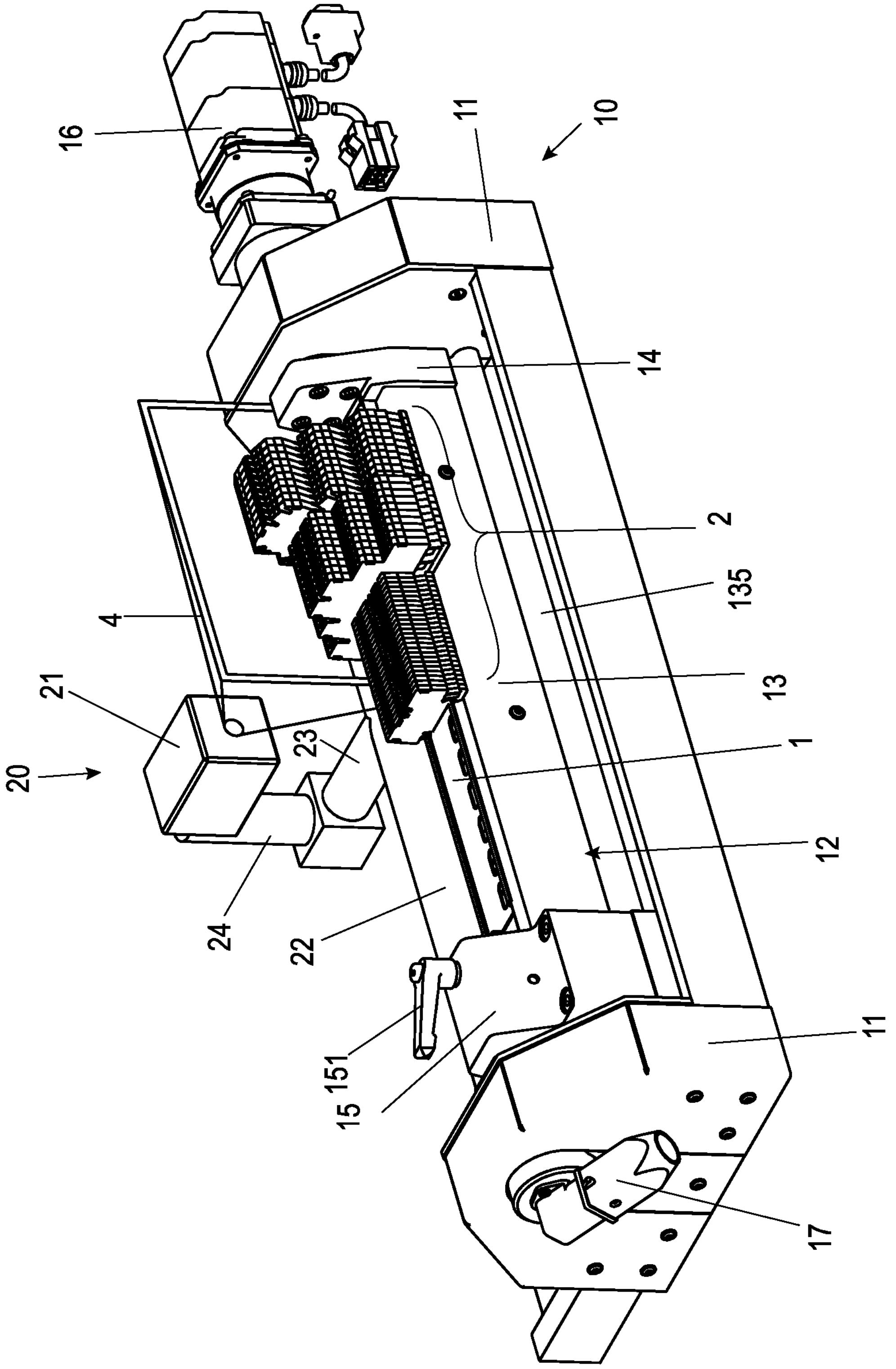
Figure 3:
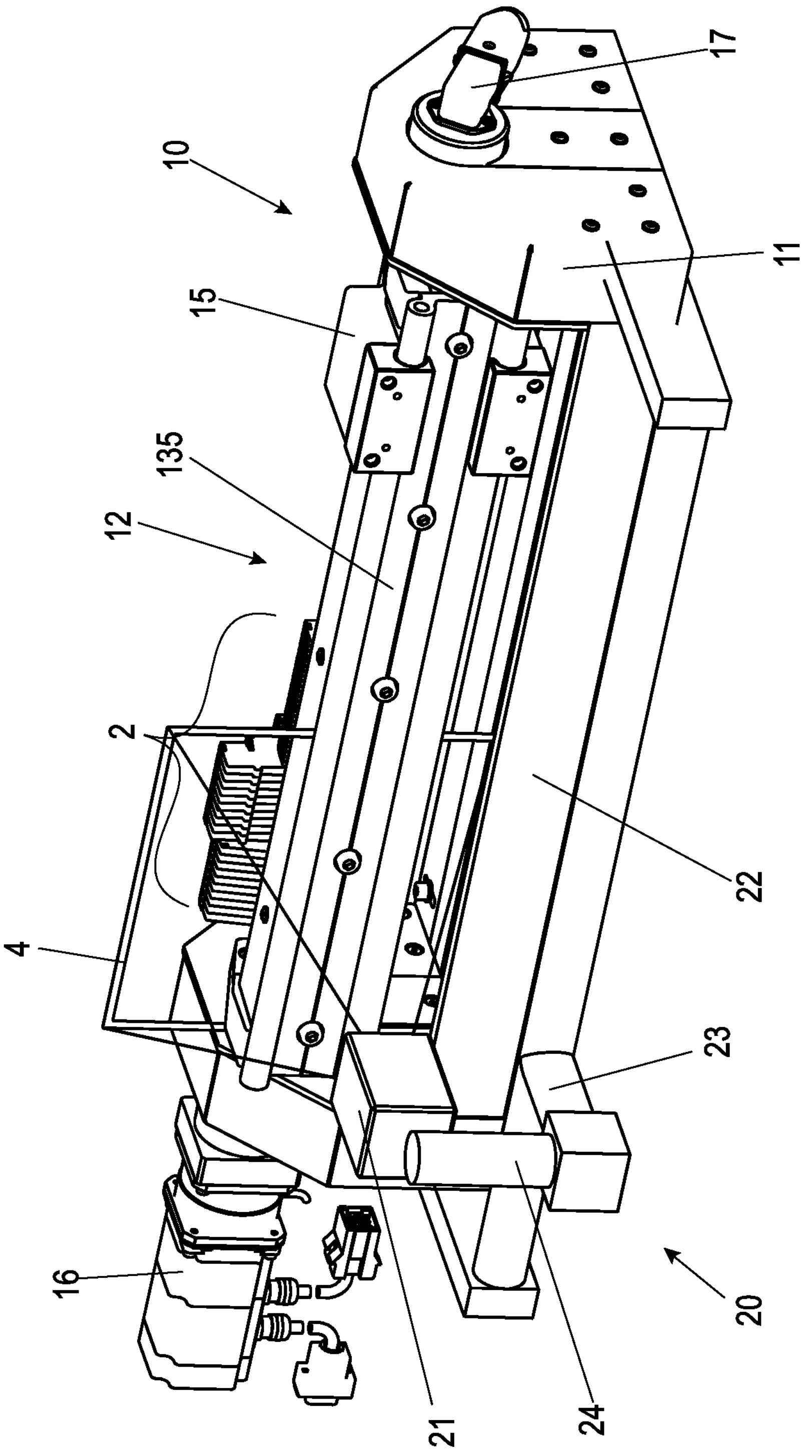
Figure 4:
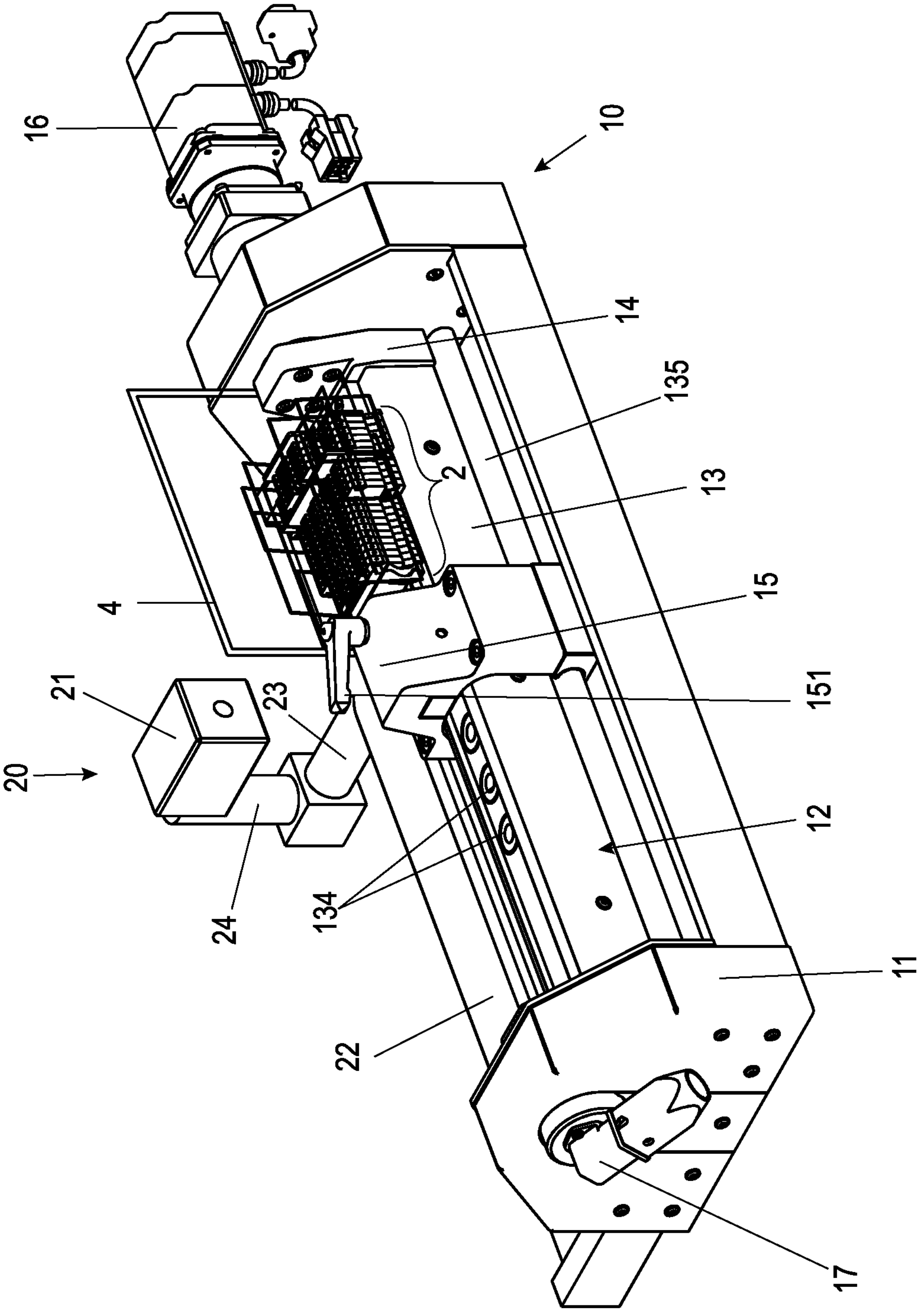

FIGS. 1, 2 and 4 show the marking device with differently equipped support rails 1. The viewing direction in which the device is shown is the same in the three cases mentioned. FIG. 3 shows the marking device with support rail 1 and terminal blocks 2 as shown in FIG. 2 from a different viewing direction.

The marking device has a pivoting device 10 for receiving and also for carrying out a pivoting movement of the support rail 1 with the terminal blocks 2. The actual marking (inscription) on the terminal blocks 2 is carried out by a laser arrangement 20. The marking device including the laser arrangement 20 is controlled by a control device not shown here. In the following, first the pivoting device 10, then the laser arrangement 20 will be described in more detail.

The pivoting device 10 has a frame 11 in which a receptacle 12, designed in the manner of a swing, is arranged rotatably about its longitudinal axis. The receptacle 12 includes a longitudinal member 13 extending in the longitudinal direction, which is arranged eccentrically relative to an axis of rotation at both ends via pivot arms 14. This axis of rotation is rotatably mounted in corresponding bearings in end parts of the frame 11 and is coupled to a drive 16. The drive 16 is, for example, an actuator with position encoder. In order to achieve high torques and correspondingly fast rotational acceleration and thus short positioning times, a possibly speed-reduced DC motor is particularly suitable for the actuator.

Figure 5A:
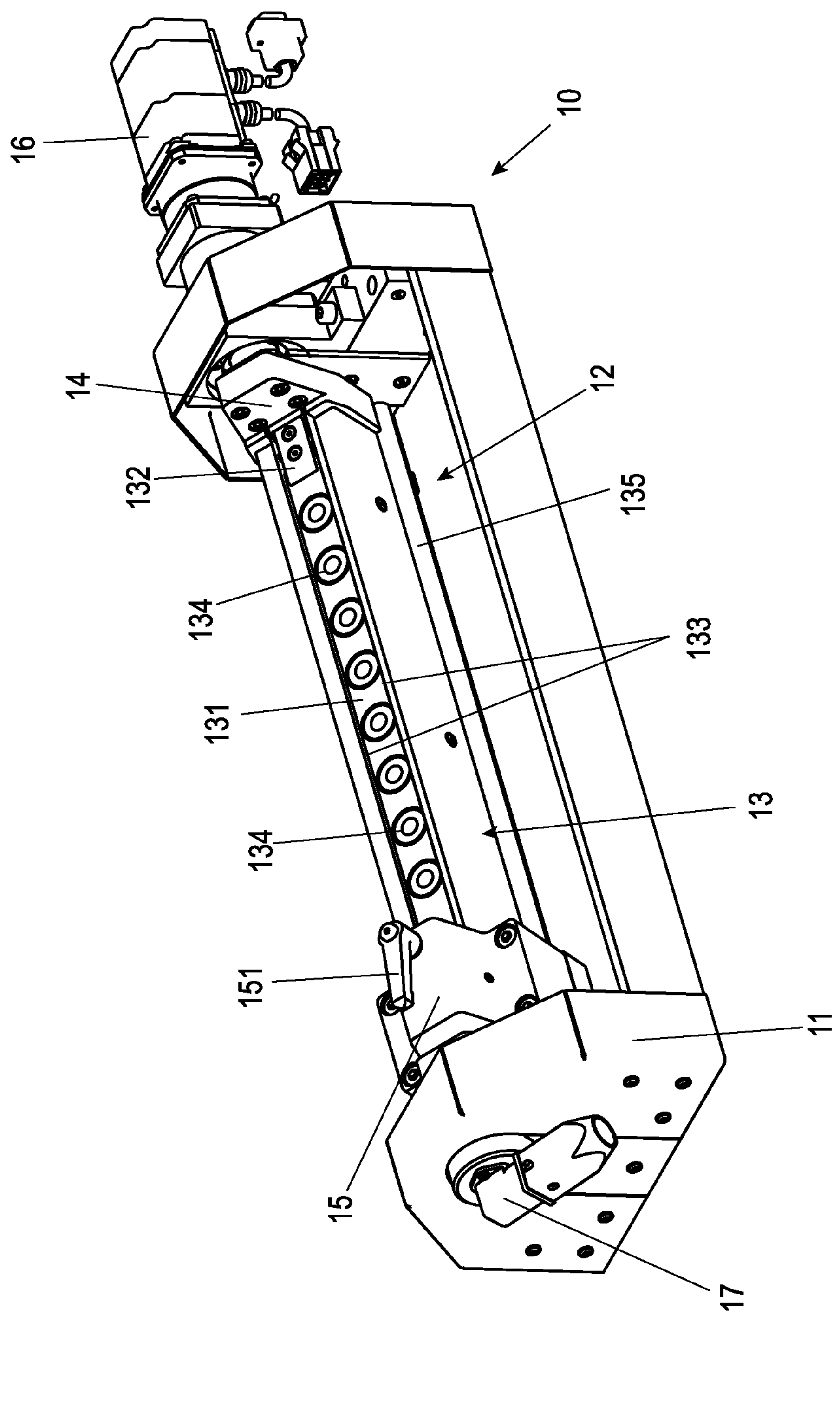
FIGS. 5*a*-*c* are perspective, front and top views, respectively of a pivoting device of the marking device shown in FIGS. 1-4.
Figure 5B:
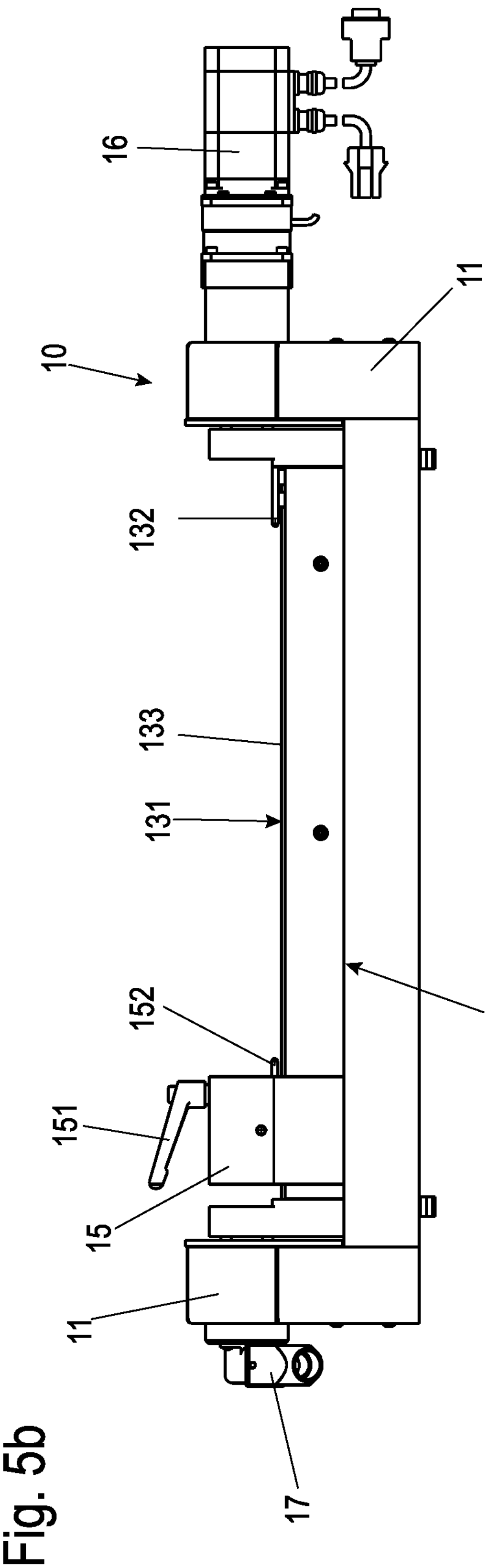
Figure 5C:
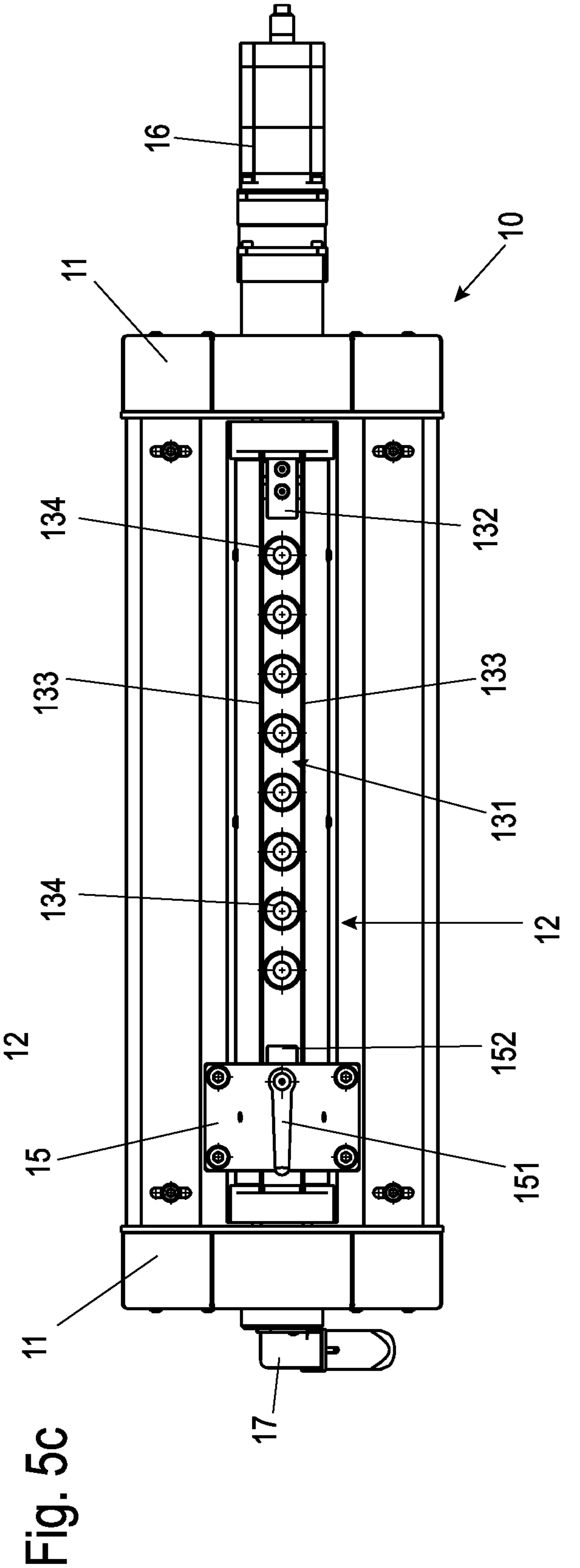

The support rail with the terminal blocks 2 is placed on the longitudinal member 13 for marking, which provides a receiving bed 131 for this purpose. This receiving bed 131 and other details of the longitudinal member 13 can be seen in FIGS. 5*a*-5*c*, which show the pivoting device 10 in various views separately from the laser arrangement 20 and without the support rail 1 attached. FIG. 5*a* shows the pivoting device 10 in an isometric view, FIG. 5*b* in a side view and FIG. 5*c* in a top view.

A fixed receiving lug 132 is arranged at one end of the longitudinal member 13, under which an end section of the support rail 1 is pushed in order to fix the support rail at this side to the receiving bed 131. The opposite end of the support rail 1 is fixed by means of a comparable receiving lug 152, which, however, is not fixed in position but is arranged on a displaceable rider or carriage 15. The rider 15 is guided longitudinally displaceably on the longitudinal member 13, for which purpose guide rails 135 are provided laterally on the longitudinal member 13 in this exemplary embodiment, for example. The rider 15 is equipped with a quick-release lever 151, which allows fixing or releasing a locking of the rider 15 on the longitudinal member 13. After the rider 15 has been released, it can be moved in the direction of the attached support rail 1 until the receiving lug 152 attached to the rider 15 (see FIGS. 5*b*, 5*c*) fixes the support rail 1 in the receiving bed 131.

In addition, side guide plates 133 are provided in the longitudinal direction of the longitudinal member 13 at the lateral edges of the receiving bed 131, which laterally guide the support rail 1 along its entire length.

Figure 6:
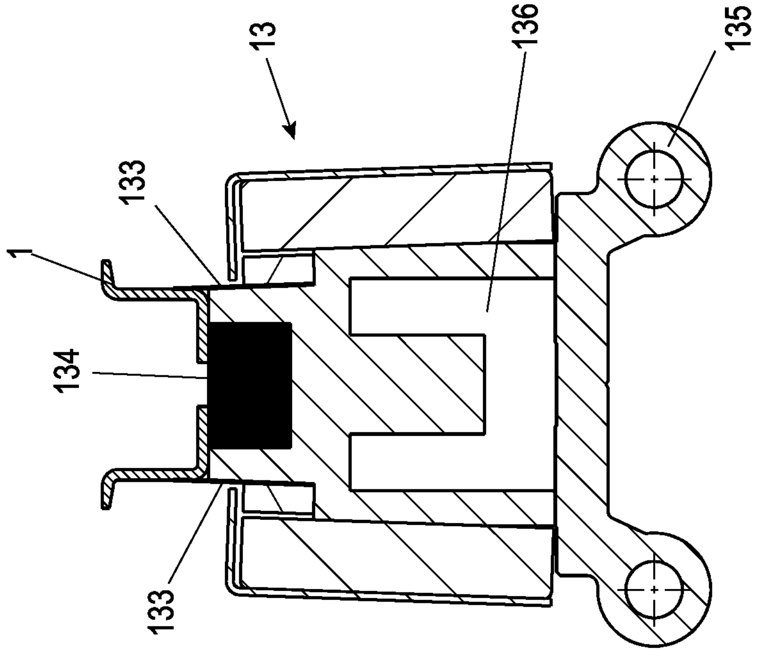
FIG. 6 is a cross-sectional view of a longitudinal member of the pivoting device according to FIGS. 5*a*-*c;*

FIG. 6 shows a cross-section through the longitudinal member 13 with an attached support rail 1. The side guide plates 133 laterally embrace the support rail 1 in a lower area. The side guide plates 133 are preferably designed as spring steel plates so that they can compensate for tolerances in the width of the support rail 1. The side guide plates 133 are preferably so thin and project only far enough above the receiving bed 131 that they guide and position the support rail 1 but do not collide with latched-on electrical devices 2. This is possible because the support rail receptacles on the electrical devices 2 usually have a small lateral clearance at least in the lower region of the support rail. The side guide plates 133 are particularly helpful for longer support rails 1, since production and/or transport-related longer support rails 1 tend to deflect. Due to this deflection, exact positioning of the support rails and thus of the electrical devices to be labeled would not be possible or achieved by the side guide plates 133.

Further, a plurality of electromagnets 134 are arranged spaced from each other in the receiving bed 131 in the longitudinal direction of the support rail 13. After the support rail 1 has been placed in position, the electromagnets 134 are energized individually, in groups or together so that they fix the support rail 134 firmly in the receiving bed 131 without a gap due to deflection. A current supply for the electromagnets 134 is provided via a rotary feedthrough 17, which is preferably arranged on the side of the pivoting device 10 opposite the drive 16.

The displaceability of the rider 15 makes it possible to insert support rails 1 of different lengths into the pivoting device 10. The described method of fixing the support rail also allows support rails of different heights to be used.

FIG. 4 shows an example with a shorter inserted support rail 1. In this case, too, it can be provided that all electromagnets 134 are energized. Alternatively, it is possible to energize only a number of electromagnets 134 that are located in the area of the actually inserted support rail 1.

As FIG. 6 further shows, a channel extending in the longitudinal direction of the longitudinal member 13 is formed in the longitudinal member 13 through which cables for energizing the electromagnets 134 can extend. The channel 136 further serves to reduce weight in order to minimize the rotational moment of inertia of the receptacle 12, in order to achieve a high rotational acceleration with the lowest possible torques.

Due to the pivot arms 14, the receiving bed 131 for the support rail 1 is arranged eccentrically from the axis of rotation during the rotary movement. Preferably, the distance by which the receiving bed 131 is spaced from the axis of rotation is in the range of 20 to 30 millimeters (mm) and particularly preferably about 23 mm. The reason for this is that, on average, the center of mass of the electrical devices 2 to be labeled—especially in the case of terminal blocks—lies about 23 mm above the support rail receptacle of the electrical devices 2. If the receiving bed 131 is spaced from the axis of rotation by the aforementioned distance, the electrical devices 2 are rotated on average in their own center of mass, which enables a fast and preferably inertia-free rotational movement. In this way, the forces occurring during an acceleration of the rotary motion are minimized. In this way, the highest possible rotational acceleration and thus a pivoting movement that can be executed quickly is achieved, which shortens the marking process overall.

Preferably, the drive 16 and the rotary feedthrough 17 are designed in such a way that an unlimited angle of rotation is possible during the rotation of the receptacle 12. In this way, the rotational or pivoting movement of the receptacle 12 can take place in any direction at any time, unaffected by any other restrictions. The advantages resulting for the marking process will be explained in more detail below.

As described above, the laser arrangement 20 is arranged laterally next to the pivoting device 10 in the area of the receptacle 12. The actual marking on the electrical devices 2, i.e. in the example shown on the terminal blocks 2, is carried out by a laser head 21 which includes all components necessary for applying the marking, in particular a laser as well as deflection and, optionally, focusing units in order to be able to deflect the laser beam for applying the marking.

Various techniques can be used to mark the electrical devices 2 with a laser. For example, it is possible to use an infrared laser as the laser of the laser head 21, for example a $CO_2$ laser that emits light of a wavelength of about 10.6 micrometers (μm). When an infrared laser is used, it is common for marking fields sensitive to infrared radiation to be provided on the electrical devices 2, which change color when infrared laser radiation is incident thereon, so that a marking can be made. The marking fields can be in the form of stickers, applied coatings and/or by using a corresponding infrared-sensitive plastic in sections on the electrical devices.

Further, it is possible and preferred to use a laser head 21 with a laser emitting in the ultraviolet wavelength range of about 190 to 380 nanometers (nm), especially at 355 nm. Such a laser can be, for example, an Nd:YAG laser or also a $CO_2$ laser with downstream frequency tripling. Light in the UV wavelength range offers the advantage that markings can be applied to almost any plastic surface. Electrical devices can still have designated fields for marking, but these do not need to be provided with a special coating or plastic. In addition, it is possible to apply markings to areas of the electrical devices that are not specifically designated. Moreover, through suitable parameters and focusing of the laser radiation, not only pure color changes can be used for marking, but a material removal or a material modification of the marked material can be achieved, which makes the markings palpable (i.e. such as tactile marking).

The laser head 21 is controlled by the control device (not shown) to apply a marking within a focus field 4. The focus field 4 is shown in FIGS. 1-4. The exact size, as well as the distance, at which the focus field 4 is located in front of the laser head 21 depends on the imaging properties of the laser head 21. Within the focus field 4, the laser head 21 can apply markings, in particular characters, numerals and/or symbols, to surfaces to be marked. Generally, a laser beam generated in the laser head 21 is deflected by a plurality of rotatable or tiltable mirrors to reach each point in the focus field 4. Since the mirrors have low inertia, the movement of the mirrors and thus the deflection of the laser beam is a fast process compared to other mechanical movements in the system.

As can be seen in FIGS. 1-4, the focus field 4 is smaller than the maximum length of the support rail 1 with the electrical devices 2 to be labeled. To enable labeling along the entire length of the support rail 1, the laser arrangement 20 has a linear guide 22 in the longitudinal direction of the longitudinal member 13. This direction is also referred to below as the Z-direction. The linear guide 22 extends over substantially the entire length of the receptacle 12 of the pivoting device 10. The linear guide 22 can be in the form of a spindle or rack drive, for example. However, other drives are also possible. For reasons of clarity, drive motors of the linear guide 22 are not explicitly shown in the figures.

The laser head 21 is attached to a movable carriage of the linear guide 22 by a holder, which allows position adjustment of the laser head 21 also in the X- and Y-directions perpendicular to the Z-direction. In the illustrated exemplary embodiment, a linear guide 23 is provided in the X-direction and a linear guide 24 is provided in the Y-direction. In the example shown, the X-direction is horizontal and the Y-direction is perpendicular.

By moving the laser head 21 in the X-direction using the linear guide 23, the distance of the laser head 21 from the area to be marked can be changed. By shifting in the Y-direction with the aid of the linear guide 24, areas to be marked that are further up or down can be reached. If the laser head 21 has an internal possibility of adjusting the focus distance, the linear guide 23 can be optionally dispensed with and this can be designed as a holder with a fixed distance. If the model variety of the electrical devices 2 to be labeled does not provide for large height differences of the devices, it may be possible to dispense with a linear guide in the Y-direction and the corresponding linear guide 24 can be designed as a fixed holder. The height difference refers to a variation in the distance of the areas to be marked from the support rail.

The laser arrangement has an image capture device 25, e.g. a camera, in particular a line scan camera. This can be arranged independently of the laser head 21 in such a way that it is aligned with the pivoting device 10 and thus an inserted support rail 1. Advantageously, as in the device shown, the image capture device is arranged in such a way that it can be moved by the linear guide 22 in the X-direction along the support rail receptacle. For this purpose, the image capture device can be arranged on the laser head 21 or, as in the present case, it is integrally formed therein. In this case, it can be moved not only in the X-direction, but also in the Z-direction and possibly in the Y-direction. A combination of a line scan camera, whose recorded image line is aligned transversely, in particular perpendicular to the X-direction, and a traversability in the X-direction makes it possible to image support rails 1 of any length in one image with a variable number of pixels in the X-direction.

The image capture device 25 can be used at various stages of the marking process. First, the image capture device 25 can be used to image a support rail 1 after it has been inserted, optionally in various pivoted positions, to verify whether the support rail 1 that has been inserted and is to be marked is correctly configured, e.g. whether it actually has the electrical devices 2 to be marked in the correct orientation and sequence. Furthermore, it can be checked whether the devices 2 are correctly positioned in that marking surfaces to which the markings are to be applied are in the position stored for the respective marking. If deviations are found which lie within a pre-definable tolerance range, the positions at which the markings are subsequently applied can be adapted to the positions found for the marking areas. This procedure is explained in more detail below.

On the other hand, the image capture device 25 can be used to monitor the actual marking process. An applied marking can be checked for correctness and/or legibility. For this purpose, a renewed image of the support rail 1 and the electrical devices 2 can be taken after the markings have been applied. In particular, if the image capture device moves along with the laser head 21, an inspection of each individual marking can be performed immediately after or even during its application.

The marking process is explained in more detail below.

To apply the marking to the electrical devices 2 of the support rail 1, the laser head 21 is moved with the aid of the linear guide 22 so that at least some of the markings to be applied lie in the area of the focus field 4. For example, marking levels 3 are drawn in FIG. 1, indicating levels in which markings are to be applied to the various terminal blocks 2. In the example of FIG. 1, a plurality of identical terminal blocks 2 are arranged on the support rail 1, with areas to be marked being arranged on different sides of the terminal blocks 2 at contacts arranged at different heights (relative to the support rail 1). A marking level 3 accommodates all markings that can be applied to one or more of the terminal blocks 2 without either pivoting the receptacle 12 or moving the laser head 21.

Figure 7A:
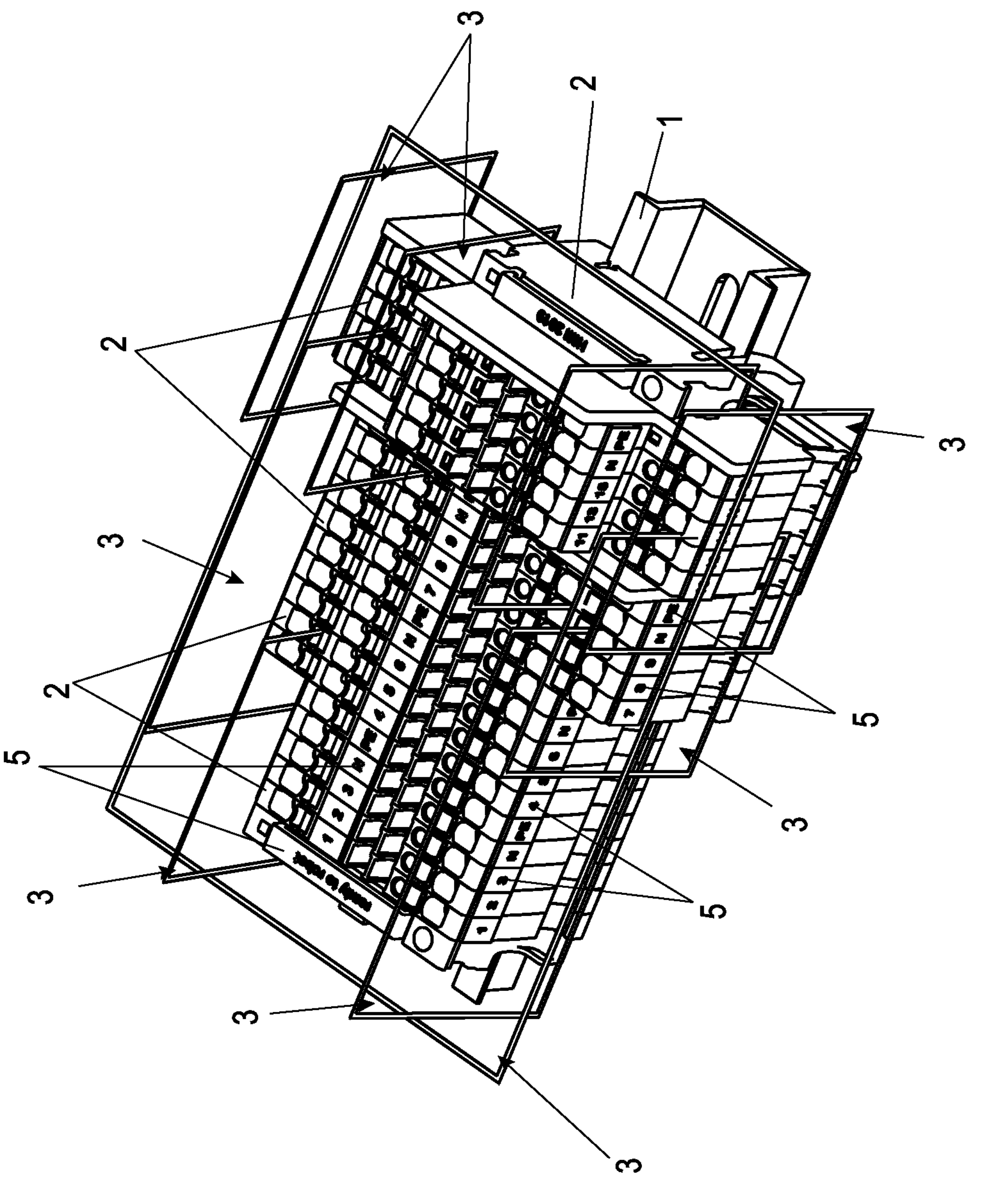
FIGS. 7*a* and 7*b* are different perspective views, respectively, of electrical devices on a support rail.
Figure 7B:
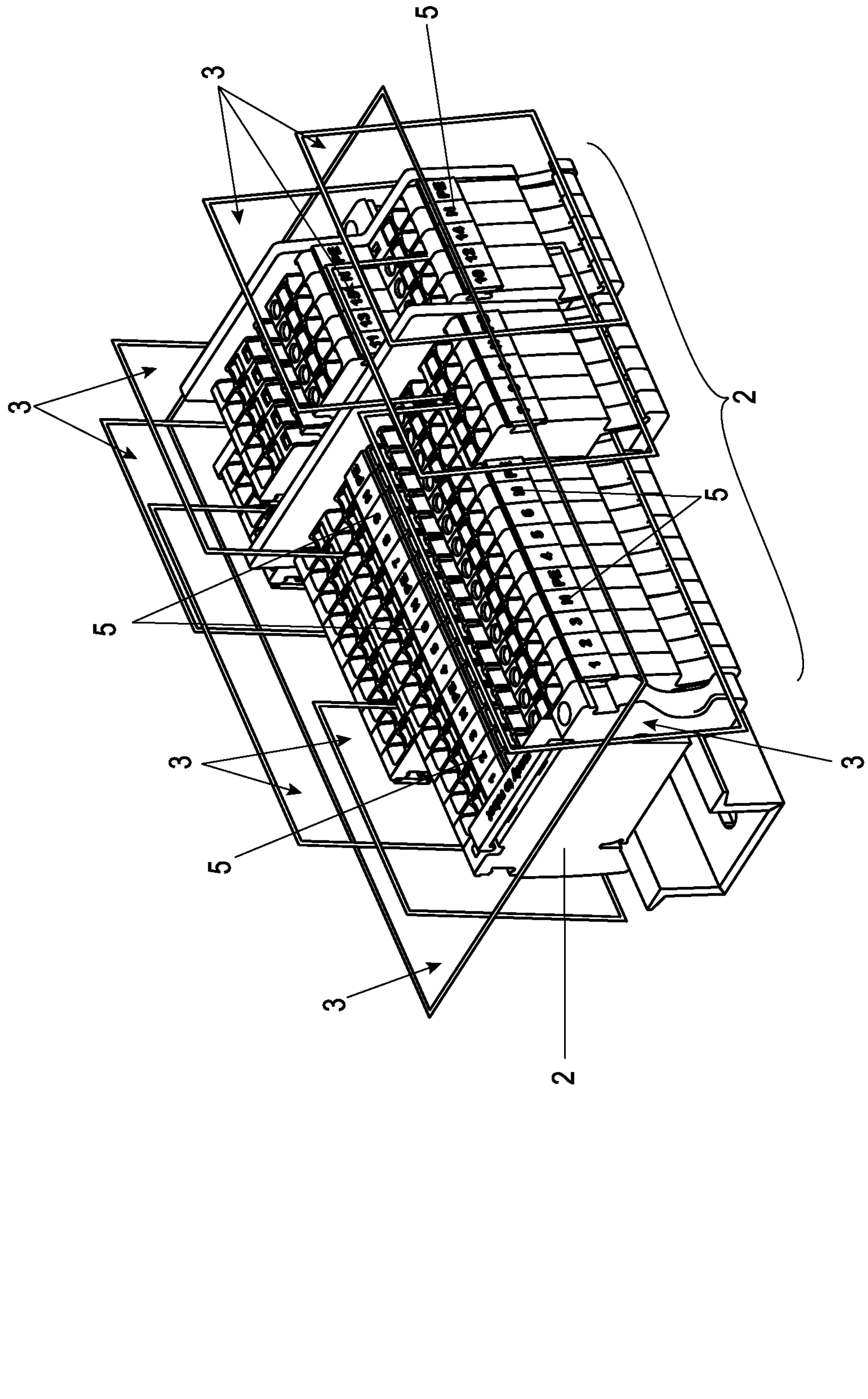

In FIGS. 7*a* and 7*b*, the support rail 1 with latched-on electrical devices 2, which can also be seen in FIG. 5, is shown separately from the marking device in order to better illustrate the different marking levels 3. FIGS. 7*a* and 7*b* each show the support rail 1 from different viewing directions in isometric representations.

In these figures, various markings 5 already applied to the electrical devices 2, i.e., the terminal blocks 2, are shown by way of example. The markings 5 are, for the most part, terminal markings applied to spaces provided for this purpose next to terminals. Other of the markings 5 concern, for example, customer-specific identification or order numbers or assembly designations or the like.

To apply the marks 5, the various marking levels 3 are brought into the plane of the focus field 4 one after the other, which is done by pivoting the receptacle 12 and, optionally, by actuating the linear guide 22 in the Z-direction and/or the linear guide 23 in the X-direction and/or the linear guide 24 in the Z-direction. All markings located in the marking level 3, which is then in the focus field 4, are applied by the laser head 21 before a next one of the marking levels 3 is brought into the focus field 4.

As FIG. 3 shows, due to the free pivotability of the receptacle 12, markings can also be applied to the underside of the terminal blocks 2. The free pivotability also makes it possible to switch to the other side of the terminal blocks 2 via the underside of the longitudinal member 13. If, for example, marking fields are provided on both sides of the rail-mounted terminal blocks 2 that are inclined downwards, a rotation via the underside, i.e. a rotation in which the underside of the longitudinal member 13 rather than the top side of the rail-mounted terminal block 2 passes the laser head 21, would result in a rotational movement of less than 180° instead of having to perform a rotational movement with more than 180° via the top side.

The various marking levels 3 are characterized by their position in space as well as their dimensions. In summary, these properties are referred to as the spatial coordinates of a marking level 3. With regard to the position in space, not only the position, but also in particular an inclination of the marking levels 3 is relevant, since markings, in order not to be distorted and/or blurred, can only be applied to surfaces which lie in the focus field 4 with regard to the distance to the laser head 21 but also with regard to the inclination.

In order to apply the markings 5 to the electrical devices 2 of the support rail 1, information about the configuration of the support rail 1, i.e. about the latched electrical devices 2, is transmitted to the control device, which controls both the laser head 21 and the linear guides 22-24 and also the drive 16 of the pivoting receptacle 12, as well as information about which marking 5 is to be applied to which device at which position with which inclination. This information is also referred to collectively as marking instructions in the context of this application.

In order to apply the markings 5, the marking levels 3 in which markings 5 or the underlying marking instructions are grouped together are first determined in a first part of the method. A marking level 3 thus contains at least one, preferably a plurality of markings 5, all of which are located in this marking level 3 and which, moreover, do not differ with respect to marking parameters to be used. Marking parameters relate to the setting of the laser of the laser head 21, which must be set in order to apply the marking. For example, a marking parameter is the power of the laser and the marking speed, which together affect the energy input per area of the marking. These marking parameters are essentially dependent on the material to which the marking 5 is applied. Information about the material to be marked is also available with the data set describing the support rail 1 and the electrical devices 2. It may be directly included with the marking instructions or it may be accessible via linked product information.

Figure 8:
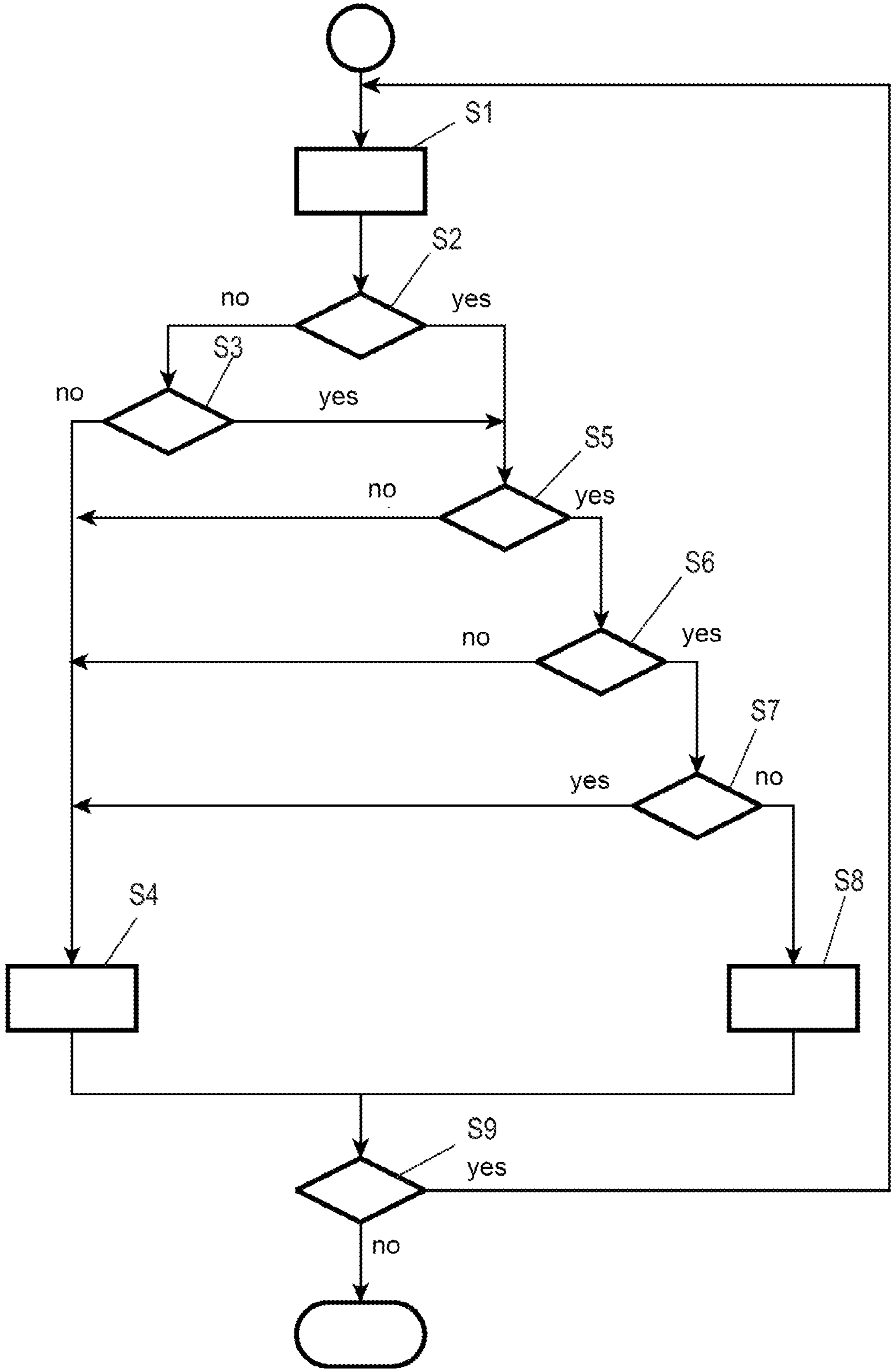
FIG. 8 is a flowchart of part of the method for determining marking levels.

An exemplary embodiment of a method for defining the different marking levels 3 is shown in FIG. 8 in the form of a flowchart.

In a first step S1, a first marking instruction (or, in subsequent repetitions of step 1, a next marking instruction) is first retrieved from the transmitted information about the markings 5 to be applied.

In a next step S2 it is determined whether the marking 5 specified by this marking instruction is to be applied with the same marking parameters on the same electrical device 2 as the last one considered. If this is not so—as for example in the first run of the method—the method branches or proceeds to a next step S3, in which it is checked whether the orientation of the area to be marked is the same as for previously made markings 5. If this is not so, the method proceeds to a next step S4, in which a new marking level 3 is generated.

In a next step S9, a check is then made to see whether there are any further marking instructions that have not yet been assigned to any marking level 3. If there are no further marking instructions that have not yet been assigned, this section of the method is completed. If there are further marking instructions that have not yet been assigned to a marking level 3, the method branches or reverts back to step S1, in which the next marking instruction is retrieved.

If it is determined in step S2 that the currently considered marking instruction concerns the same electrical device as the previously processed one and also the same marking parameters are used, the required marking levels are usually already created and a new marking level does not necessarily have to be opened. In that case, the method continues in a step S5. Step S5 is also reached if it is determined in step S3 that the current marking instruction concerns a different electrical device 2 than the one previously considered, but that marking 5 is to be applied to a surface with the same orientation.

In the following step S5 it is queried whether the marking 5 is to be made on the same material to be marked or at least on a material which requires the same setting of the laser of the laser head 21. If this is not so, i.e. if changed marking parameters are to be used, the method proceeds to step S4, in which a new marking level 3 is generated.

If the marking parameters do not need to be changed, the method proceeds to a next step S6. In the step S6 it is checked whether the current marking lies within the focus area of one of the marking levels 3 already created. The background to this is that the focal plane 4 of the laser head 21 allows a depth of field—albeit small—of up to typically a few millimeters in distance. Markings which, with the same orientation of the area to be marked and the same required laser parameters, differ only by a few millimeters (or a difference in distance in the range of depth of field) with regard to the distance of the laser head 21 to the area, can therefore be combined in the same marking level 3.

However, if the current marking 5 to be applied lies outside the focus area, the method proceeds again to step S4 to generate a new marking level. If the current marking lies in the focus area of an already existing marking level 3, the method branches to a step S7, in which it is checked whether the marking 5 to be applied is possibly shaded. A shadowing situation may exist, for example, if from the point of view of the laser head 21 the marking 5 lies behind a protruding part of an adjacent electrical device 2, so that the laser beams could not reach the marking area at all from the present position of the laser head. If such a shadowing situation exists for the currently considered marking instruction, the method branches to step S4 to assign the marking instruction to a new marking level.

If there is no shadowing situation for the current marking instruction, the method branches to a next step S8, in which the current marking instruction is added to this already existing marking level 3. Also from step S8, the method continues with step S9 to optionally consider further marking instructions.

For the actual application of the markings 5 to the electrical devices 2, the various marking levels 3 are then brought one after the other into the plane of the focus field 4, which is carried out by pivoting the receptacle 12 and, optionally, by actuating the linear guide 22 in the Z-direction and/or the linear guide 23 in the X-direction and/or the linear guide 24 in the Z-direction. All markings located in the marking level 3, which is then disposed in the focus field 4, are applied by the laser head 21 before a next one of the marking levels is brought into the focus field 4.

In order to determine the sequence in which the generated marking levels 3 are approached and processed starting from a neutral starting position of the laser head 21 and also of the receptacle 12, according to the application the various movements of the laser head 21 or of the receptacle 12 for the support rail 1, which are necessary for a change to the next marking level, are taken into account. These movements are assigned different priorities, with the evaluation depending on the time involved in carrying out the movement. Since, in particular with the design of the marking device as described in connection with FIGS. 1-6, a pivoting of the support rail 1 can be performed much faster than a movement of the laser head along the support rail 1, the criterion "no movement of the laser head 21 in the Z-direction" has a higher priority than the criterion "no rotation of the receptacle 12".

Priority can also be assigned to the other two degrees of freedom of movement of the laser head 21, i.e., movement in the X- and Y-directions, respectively. Although the feed rates of the linear guides 23, 24 for the X- and Y-directions are generally comparable to those of the linear guide 22 for the Z-direction, the distances to be covered are generally smaller for these two axes of motion. From this point of view, the premise "no movement in Z-direction" has in any case higher priority than the premise "no movement in Y-direction" and "no movement in X-direction". The priorities given to the movement of the X- and the Y-direction are comparable to those of the pivoting movement and can be sorted in a priority order before or after it.

Movements of the laser head in X-direction are often very small. Movements in the Y-direction can be larger, but occur less frequently, since a movement in the Y-direction from a normal position is only required for very large devices to be marked. A priority sequence of "pivoting before movement in the X-direction before movement in the Y-direction before movement in the Z-direction" is therefore preferred.

Figure 9:
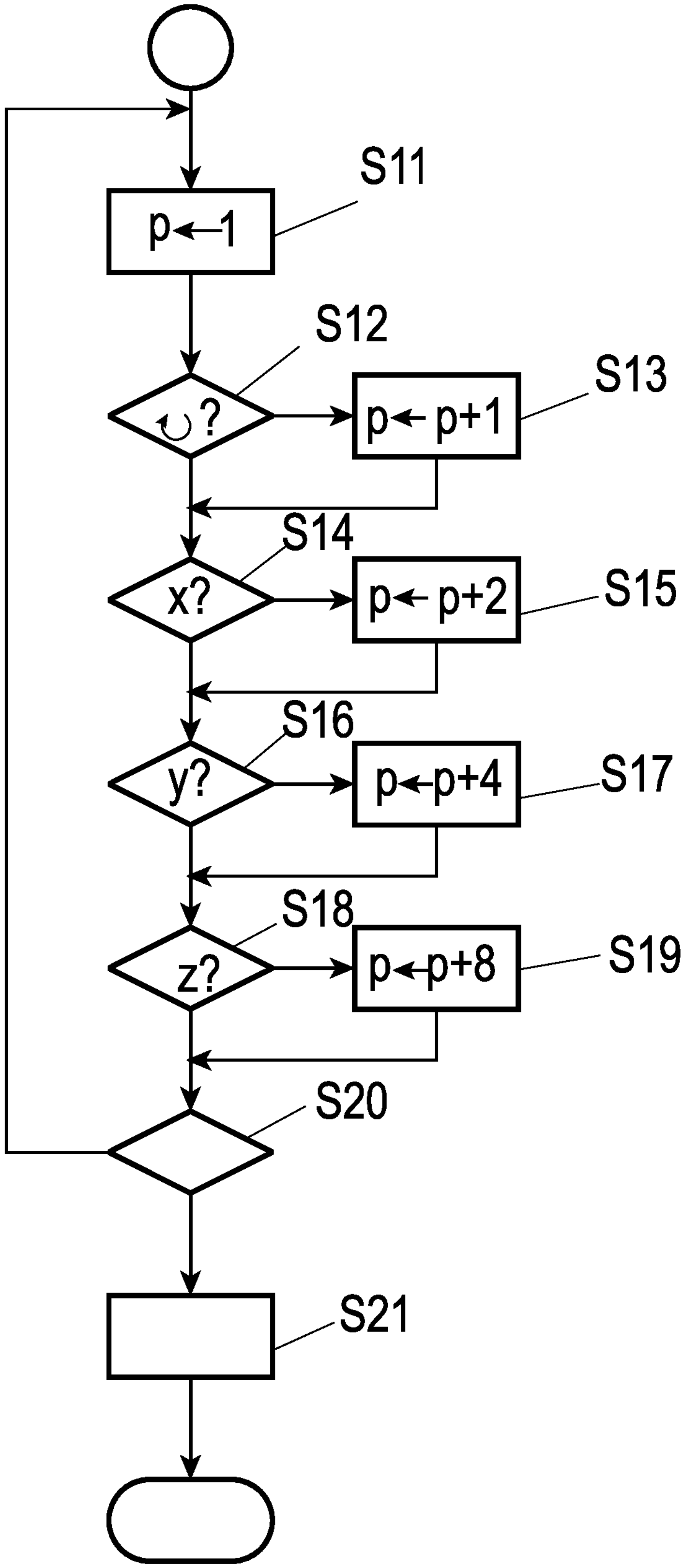
FIG. 9 is a flowchart of part of the method for determining priorities for processing a next marking level.

In FIG. 9, a flowchart illustrates how an assignment of priorities can be made in an exemplary embodiment using this preferred priority order to select a next marking level for processing by the marking device.

The method iterates through the set of marking levels not yet processed to assign them a priority value p. The marking level that has the smallest priority value or one of the smallest priority values p after completion of the method shown in FIG. 9 is the next marking level processed by the marking device. The marking level that has the smallest or one of the smallest priority values p after completion of the method shown in FIG. 9 is processed as the next marking level by the marking device.

In a next step S11, a first of the marking levels still to be processed is selected and assigned a preliminary priority value p=1. In the next step S12, the system checks whether machining the marking level currently under consideration would cause the support rail fixture to pivot. If this is the case, the priority value p is increased in a step S13 by a value of a priority index assigned to this movement. Otherwise, the priority value p is retained. In this example, the priority index for pivoting the support rail support is selected to be equal to 1.

In a next step S14, it is determined whether processing this currently considered marking level would result in a movement in the X-direction. If this is the case, the priority value p is increased by the value 2 of a priority index assigned to this movement in a step S15, otherwise it retains its value.

In a next step S16 it is determined whether a processing of this currently considered marking level would result in a movement in Y-direction. If this is the case, the priority value p is increased by the value 4 of a priority index assigned to this movement in a step S17, otherwise it retains its value.

In a next step S18, it is determined whether processing of this currently considered marking level would result in a movement in Z-direction. If this is the case, the priority value p is increased by the value 8 of a priority index assigned to this movement in a step S19, otherwise it retains its value.

After step S18 or S19, a check is made in a subsequent step S20 to determine whether there are still further marking levels to be processed that have not yet been assigned a priority value p. If this is the case, the method branches back to step S11 to assign a priority value p to the next marking level to be processed.

If all marking levels still to be processed have been assigned priority values p, the method branches to a step S21 in which the marking level 3 with the smallest priority value p is selected. If there are several marking levels 3 with the smallest priority value p, any one of these marking levels 3 is selected. The marking process is then continued with this marking level 3.

After completion of the marking process in this marking level 3, the part of the marking process shown in FIG. 9 is carried out again in order to again detect the priorities for all further marking levels 3, starting from the then current position of the laser head 21 or rotary position of the receptacle 12. The method ends when all marking levels 3 have been processed.

In the example shown, the different movements are characterized by priority indices representing powers of two. Such a binary evaluation scheme is advantageous, but other priority indices can also be assigned.

Further, the priority indices are chosen such that marking levels are selected if they have a priority value p that is as small as possible. It is understood that the method can also be designed in such a way that a priority value p as high as possible leads to a selection.

In an extension of the presented method, the prioritization can additionally take into account how far the travel distances are in order to set a next marking level. Finally, it is also possible to determine the expected times for the change from one to the next marking level with known travel and approach speeds, i.e. with completely known movement dynamics of the linear guides 22 to 24 or the pivoting device 10. The times then represent the priority values according to FIG. 9. In this way, the total time required for marking the electrical devices 2 of the support rail 1 is minimized as best as possible.

As previously mentioned, various circumstances can result in the surfaces of the electrical devices 2 on the support rail 1 to which the markings are to be applied not being located in real terms at the positions where they are theoretically expected to be located according to the marking instructions.

According to the application, the image capture device is used during the method to record at least one image of relevant sections of the support rail 1 and the devices 2 to be marked. Based on the images, marking positions can be corrected. In an advantageous design, the image capture device is a line scan camera integrated into or arranged on the laser head 21. The linear guide 22 can be used to move the line scan camera along the support rail 1 to image it. The use of a line scan camera is advantageous in that the support rail 1 with the electrical devices 2 can be imaged within any longitudinal section with a correspondingly adapted number of pixels in this X-direction. Preferably, a continuous section in the X-direction is determined in such a way that all markings to be applied in a specific pivoting position are located in this one continuous section. Comparable images are recorded for further pivoting positions of the pivoting device 10 until the support rail 1 and the electrical devices 2 are detected in all areas where markings are to be applied. Advantageously, the areas in the longitudinal direction on both sides are selected to be larger by, for example, a few percent than is necessary according to the marking instructions, in order to ensure that all areas on which markings are to be applied are covered by the image.

In order to be able to take the position corrections resulting from the evaluation of the images into account when assigning the markings to marking levels, the imaging and the evaluation of the images described below are preferably carried out before the method described in connection with FIG. 8.

As a rule, special areas are provided on the electrical devices 2 for the markings, which are referred to below as marking fields. To ensure good legibility, these marking fields can be provided with a coating that differs in color from the base material of the housing of the electrical device 2. According to a further design, separate "markers" are used for marking. These are small plastic plates which can optionally be pre-labeled or are unlabeled for the method described here. The markers are clipped onto the electrical equipment at the appropriate point. These markers can also be in the form of so-called marking strips, which extend over two or more adjacent marking fields. In the context of this application, a "marking field" is to be understood as any surface to which a marker is to be applied.

Due to the coating or the use of markers, the marking fields usually have a color or brightness difference compared to the base material of a housing of the electrical devices 2. This color or brightness difference is used to find the marking fields in the recorded images. For this purpose, for example, evaluation algorithms known per se are suitable for edge detection. It is further advantageous to select or operate the image capture device, for example the line scan camera, in such a way that it uses a wavelength range in which contrasts between the marking field and the base material of the housing are particularly prominent.

During the evaluation of the images, the center point coordinates of detected marking fields are determined and compared with coordinates according to the marking instructions. On the basis of the comparison an assignment of the actual coordinates to the expected coordinates is made. Preferably, criteria are defined that relate to the limits of this assignment. For example, maximum permissible displacements may be defined, e.g. in the range of a few millimeters. If, for example, the total number of detected marking fields is smaller than the number of marking instructions or if an assignment of the detected marking fields to the marking instructions would require displacements that exceed the maximum permissible displacement, it can be provided that the method is first stopped. A manual check can be initiated to determine whether the support rail 1 used with the electrical devices 2 actually corresponds to that provided in accordance with the marking instructions.

If two marking fields are arranged so close to each other, for example because they lie next to each other on a marker strip, that they merge seamlessly into each other, these marking fields cannot be distinguished from each other by the edge detection mode described. This can be taken into account in the evaluation procedure in such a way that a larger detected marking field is automatically divided into two or more marking fields of the expected size, with a center point being calculated accordingly for each of the marking fields. It can be further provided that in a case, in which individual marking fields are not recognized reliably, the actual positions of these marking fields are calculated on the basis of determined positions of surrounding marking fields. This can be carried out in particular if it is known from the marking instructions that the material combination of these marking fields to the base material of the housing does not provide sufficient contrast for reliable recognition.

Overall, the above-mentioned additional steps of imaging the support rail 1 and the electrical devices 2, analyzing the images, determining the actual positions of marking fields, and taking these actual positions into account when applying the marking will make the marking process more reliable so that it can be performed in an automated manner with the lowest reject rates.

Figure 10A:
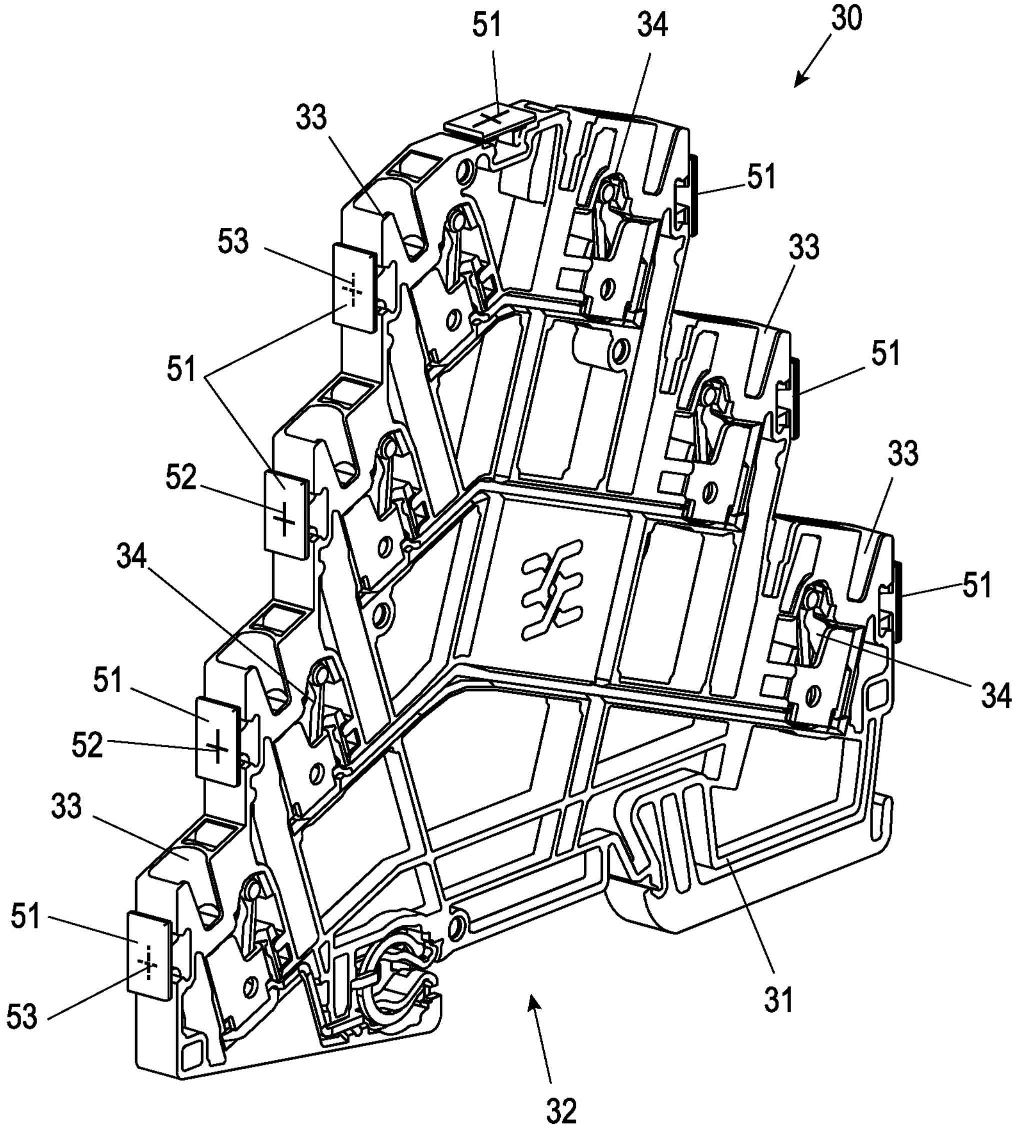
FIGS. 10*a* and 10*b* are perspective views of various terminal blocks, respectively, as examples of electrical devices to be marked.
Figure 10B:
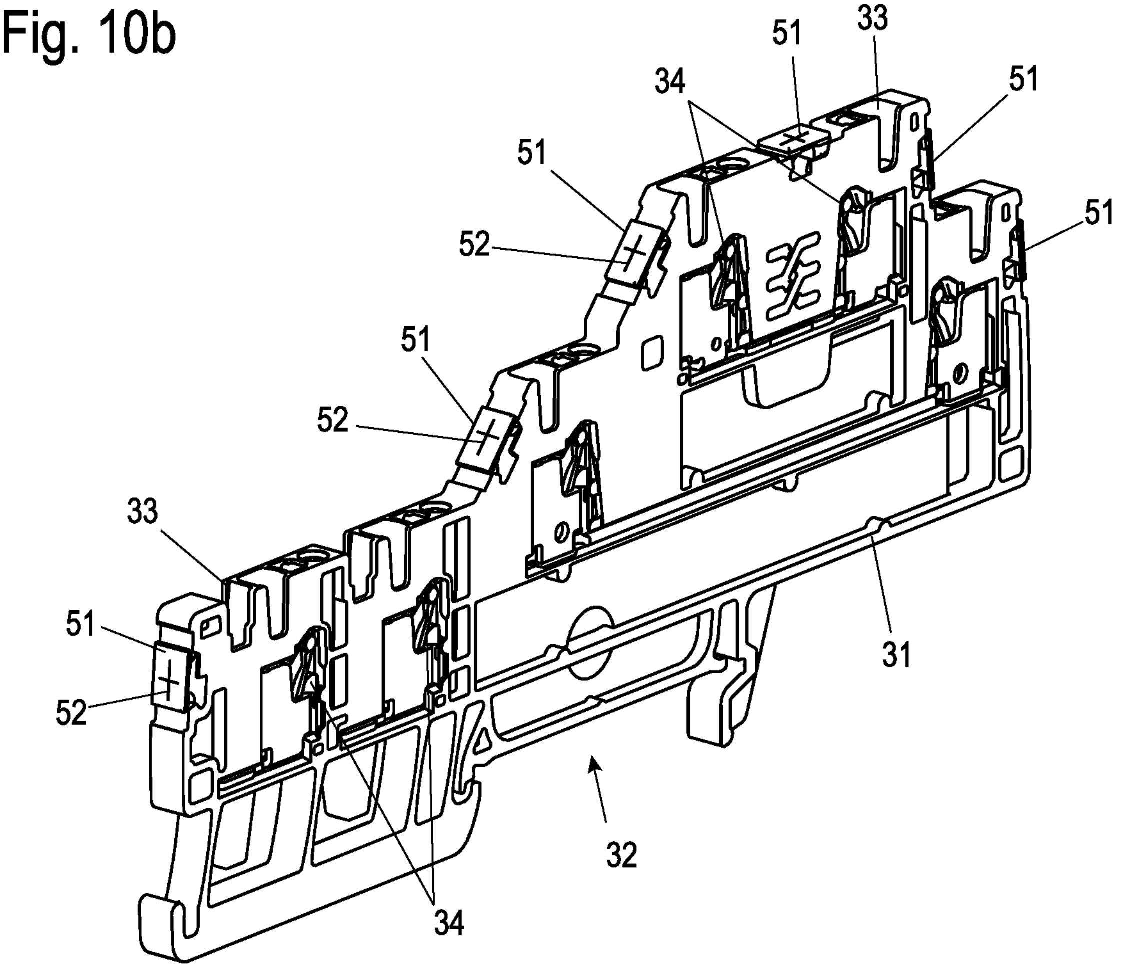
Figure 10C:
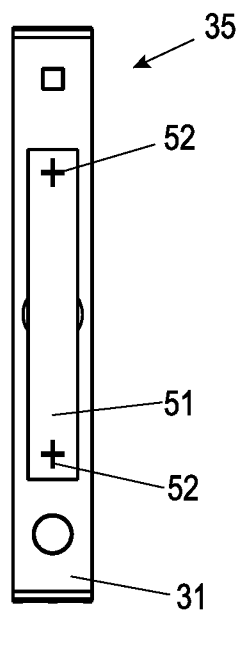
FIG. 10*c* is a top view of an end bracket as another example of an electrical device to be marked.

FIGS. 10*a*-10*c* show examples of electrical devices 2 that can be labeled using the device described above. In FIGS. 10*a*, 10*b*, two different terminal blocks 30 are shown, each in an isometric view. In FIG. 10*c*, an end bracket 35 is shown in a top view of its front opposite the support rail.

The terminal blocks 30 in FIGS. 10*a*, 10*b* each have a housing 31, on the lower side of which a support rail receptacle 32 is formed, with which the housing 31 and thus the terminal block 30 can be clipped onto a support rail 1, as shown in the figures shown above.

The terminal blocks 30 each have a plurality of clamping devices for wires, which are designed as so-called "push-in terminals". They each comprise a wire receptacle 33, i.e. an opening into which a wire to be clamped is inserted. The wire is guided through the wire receptacle 33 to a clamping spring 34, which secures it and makes electrical contact.

For labeling the various connections, the terminal blocks 30 shown do not have predetermined marking fields, but receptacles are formed in the housing 31 into which markers 51 can be inserted. This opens up the possibility of inserting pre-marked markers 51 or markers 51 which are unlabeled and which are labeled by the laser arrangement 20 using the device described in the present application or according to the method described herein. Further, marker material may also be injected into the marker channels to form a comparable integral marker on the terminal block 30 in place of the clipped-in marker 51. Finally, suitable marking surfaces may also be provided directly on the housing 51 in place of the receptacles for the markers 51.

When arranging terminal blocks 30 on a support rail, a number of terminal blocks 30 are usually bounded between two end brackets 35, one of which is shown in FIG. 10*c* and fixed to the support rail 1. The end bracket 35 also has a marker 51 on which, for example, the function or assignment of the adjoining terminal blocks 30 can be indicated. The marker 51 of the end bracket 35 is characterized by a multiple length (in a direction transverse to the longitudinal extension of the support rail 1) compared to the markers 51 of the connections of the terminal blocks 30.

A comparison of the positions (relative to the support rail receptacle 32) of the markers 51 on the terminal blocks 30, as well as their different orientations, illustrates the great flexibility required of the marking device when marking the markers 51. Further developments of the marking process are described below which, in conjunction with the previously mentioned image capture device, can improve the quality of the applied markings.

The terminal block 30 shown in FIG. 10*a* has four marking fields in its height (in a direction perpendicular to the support rail receptacle 32), which extend over a wide range due to the large height of the terminal block 30. Due to the viewing angle range of the image capture device, for example, a situation can occur in which only two, for example the two middle markers 51, are captured.

Center point coordinates are determined for these markers 51 as described above. They are entered in the form of position crosses 52 in FIG. 10*a*. Using these center point coordinates, a position correction of the marker can be made, as explained in the previous sections. Such a position correction would, of course, also be desirable for the markers 51 which are not located within the image area of the image capture device. In the example of FIG. 10*a*, these may be, for example, the markers 51 lying below or above the two central markers 51. However, the position of these markers 51, which are not visible from the image capture device, is not independent of that of the visible markers 51, since they are located on the same terminal block 30 and are thus connected in terms of their position to the position of the visible markers 51 by design.

In a further development of the marking method, the position of such non-visible markers 51 (or more generally marking fields) is extrapolated based on the known design information about the terminal block 30 (or more generally each electrical device 2 being marked) using the determined center point coordinates of detected markers 51. In FIG. 10*a*, such extrapolated center point coordinates are shown as dashed position crosses 53.

In this context, the geometric information about the terminal block 30 in question can be taken from design information in a database.

FIG. 10*b* shows that markers 51 (or, more generally, any type of marking fields) can be present not only in a planar orientation perpendicular to the support rail receptacle 32 and parallel to the support rail receptacle 32, but also at any angle therebetween. In the present example, two markers 51 are arranged centrally on the terminal block 30 at an angle of about 45° to the support rail receptacle 32. In order to enable good recognition of the center point coordinates (these are again symbolized by position crosses 52), a camera shot is preferably taken in a direction of rotation of the pivoting device 10 in which the angled markers 51 are perpendicular to the main viewing direction of the image capture device.

FIG. 10*c* shows, with end bracket 35, a top view of an electrical device in which the dimensions of marker 51 significantly exceed those of the previously shown terminal blocks 30.

In the case of such a marker 51, an advantageous further development of the method according to the invention provides for determining not the center point coordinates of the marker 51 during an image evaluation of the recordings of the image capture device, but two end area coordinates spaced apart from one another. The determined coordinates are again symbolized in the figure by position crosses 52.

Figure 11:
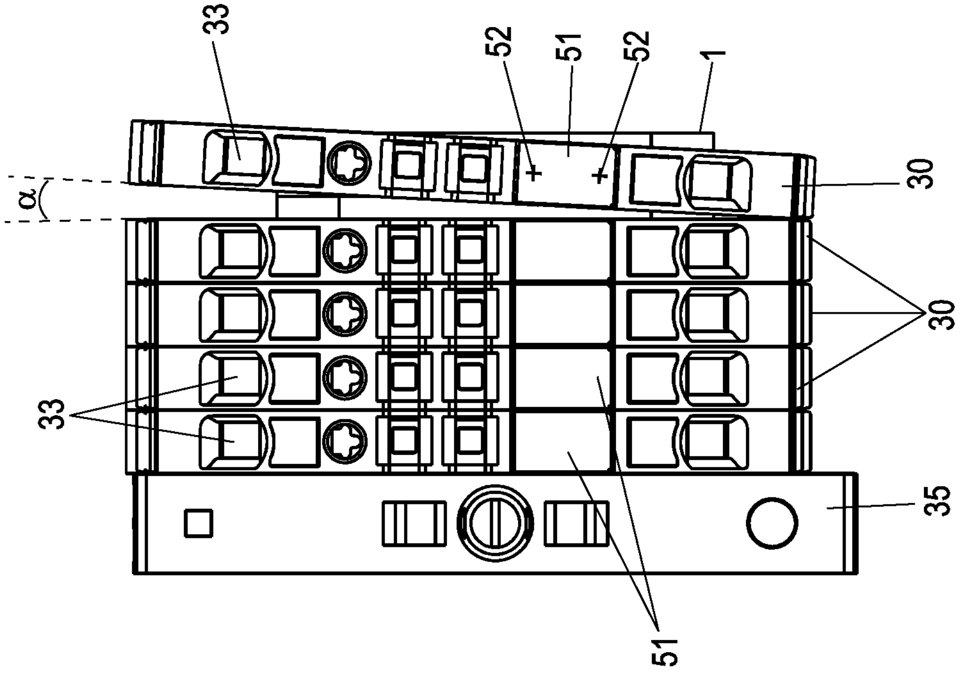

One advantage of this approach is illustrated by the example of FIG. 11.

FIG. 11 shows a plurality of terminal blocks 30 connected to an end bracket 35. In the example shown, no marker 51 is provided on the end bracket 35, but markers 51 are provided on the terminal blocks 30, and the markers used here are also enlarged in a longitudinal direction of the terminal blocks 30 compared to the markers of the terminal blocks 30 shown in FIGS. 10*a*, 10*b*. The block of the terminal blocks 30 is bounded on only one side by the end bracket 35 shown. In such a constellation, it is possible that rail-mounted terminal blocks 30 which are located further away from the end bracket 35 are positioned at an angle on the support rail 1 and exhibit a twist by an angle α with respect to the actually desired orientation. Realistically, such a twist is at most in the range of one or two degrees. For the sake of better illustration, the rotation by the angle α of about 5° is shown artificially enlarged in FIG. 11.

The twist shown affects both the calculated position of the marker 51 of the rightmost terminal block 30, and its orientation.

If the markers 51 on the terminal blocks 30 were only corrected by the image evaluation via their center point coordinates, a position shift of the marker 51 due to the rotation by the angle α would be compensated, but the alignment of an applied marker would not be applied correctly on the marker 51. Although it would extend perpendicularly to the support rail 1, it would thus be applied at an angle to the oblique marker. A correction based on two end-area coordinates 51, as shown in FIG. 10*c* and FIG. 11, respectively, makes it possible to have the marking follow the actual orientation of the marker 51 (or more generally of each marking field) in its orientation.

Figure 12:
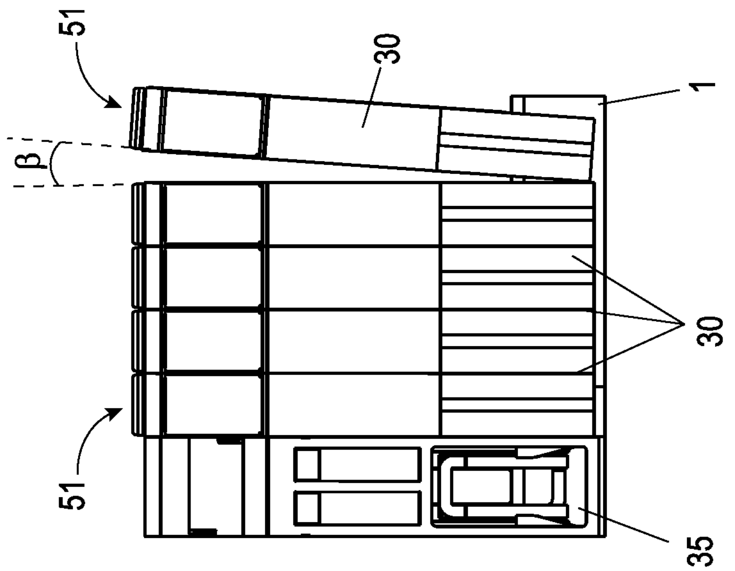
FIGS. 11 and 12 are end views of a block of terminal blocks with an end bracket with different positioning errors, respectively, for one of the terminal blocks.

Another typical effect of positioning terminal blocks in an area further away from an end bracket 35 is the so-called fanning out of the end area. This is illustrated in FIG. 12. FIG. 12 shows an arrangement of a plurality of terminal blocks 30 which abut an end bracket 35 on one side. No further end bracket is provided on the support rail 1 on the side opposite the end bracket 35 shown. As a result, the last of the terminal blocks 30 or at least the last terminal block 30 of the arrangement "fan" or "fans" out. This means that, although they sit in the correct position on the support rail 1, they tilt sideways by an angle β in their upper region from their correct position. Such "fanning out" does not lead to a change in the orientation of the markers 51 or the marking fields, but it does lead to a shift in position.

Support rails are often preconfigured in such a way that blocks of several terminal blocks 30 and, optionally, end brackets 35 alternate along the support rail with gaps between these blocks. In the evaluation process, it can be provided that an image evaluation refers to only one such block of terminal blocks at a time. Deviations in the overall positioning of the blocks compared to the intended positions can then be easily corrected for the entire block. The actual position correction then refers primarily to errors resulting from an oblique position by an angle (according to FIG. 11) or a "fanning out" by an angle β (according to FIG. 12).

The invention claimed is:

1. A method for marking electrical devices which can be arranged in a row on a pivotable support rail with a guided laser head, comprising the steps of:

(a) specifying a number of marking instructions, each of which includes a marking content and a position and an orientation of the surface to which the marking content is to be applied;

(b) creating an image of at least a section of the support rail and at least one electrical device from an image capture device, and correcting at least one of the positions at which one of the marking contents is to be applied based on an evaluation of the image;

(c) grouping the marking instructions into marking levels in such a way that all marking instructions of one marking level can be applied by the laser head without moving the laser head or the support rail, wherein the marking levels differ in terms of at least one of spatial coordinates and parameters for the laser head;

(d) selecting a first one of the marking levels;

(e) at least one of positioning the laser head and pivoting the support rail according to spatial coordinates of the selected marking level;

(f) applying markings according to the marking instructions of the selected marking level with the parameters for the laser head; and (g) selecting a next one of the marking levels for marking based on the movements of the laser head and of the support rail necessary to enable markings according to the next one of the marking levels to be applied.

2. The method according to claim 1, in which the steps of positioning at least one of the laser head and pivoting the support rail, applying the markings, and selecting a next one of the marking levels are repeated until all of the marking levels have been processed.

3. The method according to claim 1, in which a closest of the marking levels is selected such that pivoting of the support rail is preferred over movement of the laser head in a longitudinal direction of the support rail.

4. The method according to claim 1, and further comprising the following steps to select a next marking level (h) assigning priority values of remaining marking levels based on the spatial coordinates of the marking levels; and (i) selecting a next one of the marking levels for marking based on the priority values.

5. The method according to claim 4, in which the spatial coordinates of the marking levels are used to determine which movements of at least one of the laser head and of the support rail are necessary, wherein different priority indices are assigned to different movements, wherein priority indices of necessary movements are added to obtain the priority value.

6. The method according to claim 5, in which movement of the laser head in a longitudinal direction of the support rail is assigned a greater priority index than pivoting of the support rail if smaller priority values are preferred in the selecting.

7. The method according to claim 6, in which movement of the laser head in a direction other than the longitudinal direction is assigned a smaller priority index than movement of the laser head in the longitudinal direction.

8. The method according to claim 1, in which creating and evaluating at least one image is performed prior to the step of grouping the marking instructions into marking levels, wherein grouping is then performed based on the corrected positions.

9. The method according to claim 8, in which at least two images are created in different pivoted positions of the support rail.

10. The method according to claim 9, in which in the step of evaluating at least one image, one or more positions of a marking field for a mark to be applied are detected.

11. The method according to claim 9, in which in the step of evaluating at least one image, at least two positions of a marking field for a marking to be applied are detected, wherein in addition to the position of the marking, its orientation is also corrected.

12. Apparatus for marking electrical devices which can be arranged in a row on a support rail having a longitudinal axis, comprising (a) a receptacle for receiving the support rail and pivotable relative about the longitudinal axis;

(b) a laser head for applying a marking to the electrical devices, said laser head being guided such that it can be moved in at least one longitudinal direction which extends parallel to the longitudinal axis of the receptacle; and (c) an image capture device for imaging the support rail inserted into the receptacle and the electrical devices arranged thereon.

13. The apparatus according to claim 12, and further comprising a first linear guide with a displaceable carriage on which said laser head is mounted, said first linear guide being arranged parallel to said receptacle.

14. The apparatus according to claim 13, wherein said laser head is mounted on the carriage via at least one additional linear guide extending perpendicularly to said first linear guide.

15. The apparatus according to claim 12, wherein said receptacle comprises a longitudinal member with a receiving bed for receiving the support rail, and further comprising pivot arms eccentric to an axis of rotation for retaining the support rail.

16. The apparatus according to claim 15, wherein said receiving bed is arranged 20 to 30 mm eccentric of the axis of rotation.

17. The apparatus according to claim 12, wherein said receptacle is pivoted through any angle of rotation without a stop.

18. The apparatus according to claim 12, wherein said laser head comprises a laser that emits in a UV wavelength range.

19. The apparatus according to claim 13, wherein said image capture device is arranged on said displaceable carriage of said first linear guide.

20. The apparatus according to claim 19, wherein said image capture device is a line scan camera.

* * * * *